Dec. 19, 1939.      R. N. ROWE      2,183,872
WALL MOUNTING FOR ELECTRICAL DEVICES
Filed Dec. 19, 1936      2 Sheets-Sheet 1

INVENTOR
Raymond N. Rowe
BY
ATTORNEY

Dec. 19, 1939.   R. N. ROWE   2,183,872
WALL MOUNTING FOR ELECTRICAL DEVICES
Filed Dec. 19, 1936    2 Sheets-Sheet 2
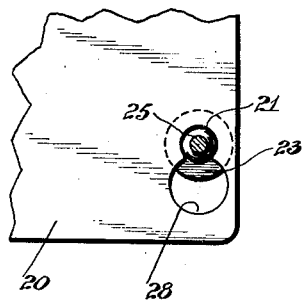
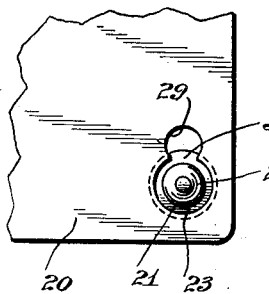
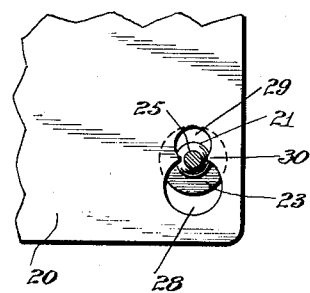
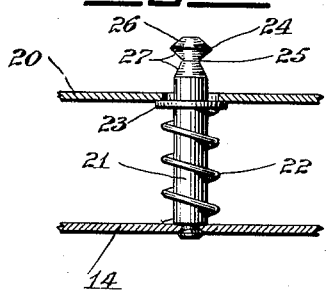
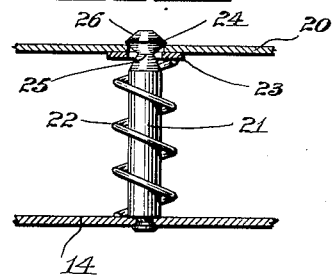
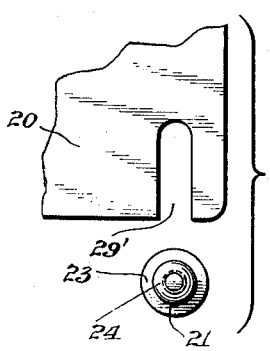
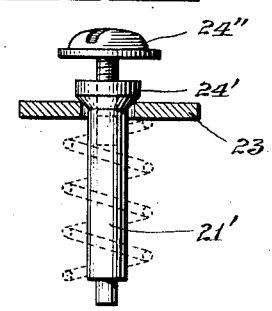
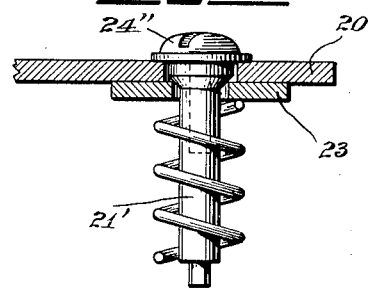
INVENTOR
Raymond N. Rowe
BY
ATTORNEY Patented Dec. 19, 1939

2,183,872

UNITED STATES PATENT OFFICE 2,183,872

WALL MOUNTING FOR ELECTRICAL DEVICES

Raymond N. Rowe, Plainville, Conn., assignor to The Trumbull Electric Manufacturing Company, Plainville, Conn., a corporation of Connecticut Application December 19, 1936, Serial No. 116,678

6 Claims. (Cl. 174—57)

My invention relates to wall type installations such as switches demountably secured in boxes and provided with detachable face plates.

It is most important that the face plate shall lie flush with the wall surface even when the box may be slightly out of plumb and it is also important that the face plate shall fit snugly against the switch unit so that there is no opening for the entrance of dirt, etc.

To accomplish these objects I detachably mount the switch unit on four guide posts with springs secured in the box. The switch unit has openings which coact with these posts to interlock the parts and yet permit the switch unit to accommodate itself to the face plate when it is applied. Preferably these posts and the openings are especially designed to permit convenient attachment and removal of the switch unit.

The accompanying drawings show the preferred form of the invention and some modifications of details.

Fig. 5 is a detail front view showing a corner of the switch plate being applied to a post.

Fig. 6 is a similar view showing the plate being slid downward to interlock the plate with the post.

Fig. 7 is a similar view with the plate interlocked with the post which is shown in section at the neck.

Fig. 8 is a detail sectional view showing the switch plate being positioned on a post.

Fig. 9 is a similar view to Fig. 8 but showing the parts completely interlocked.

Fig. 10 is a detail side view showing a modified form of post with a removable head.

Fig. 11 is a similar view with the switch plate interlocked with the post.

Fig. 12 is a front view of the corner of a plate with a modified opening for the post.

Figure 1:
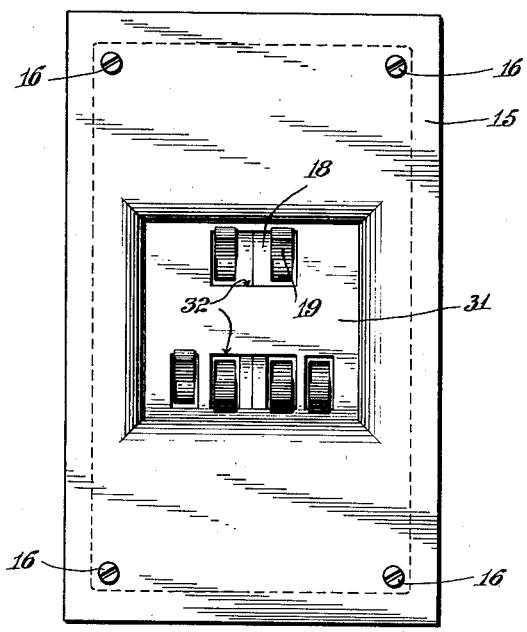
Fig. 1 is a front view of a switch construction embodying my invention.
Figure 2:
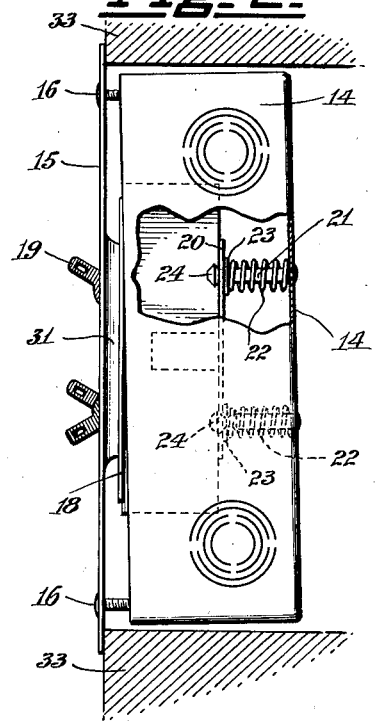
Fig. 2 is a side view of the same and showing how the face plate and the switch unit are trued up even when the box is installed out of plumb.

It is to be understood that when I speak of a switch or switch unit it is intended to include broadly any switch device, circuit breaker, fuse block, or other electrical device mounted in the manner described.

The box 14 may be of any suitable type and provided as usual with knockouts or other means for the introduction of the conductors. The face plate 15 is adapted to extend beyond the side and end walls of the box and is secured to the box by screws 16 in the corners which have seats for instance in flanges 17 at the ends of the box.

The switch unit 18 may be of any suitable type and provided with a finger lever or actuator 19. The structure shown has a number of units with appropriate actuators. The number is immaterial. A back plate 20 is secured to the switch unit and in fact may support a number of units.

Posts 21, preferably four, are secured in the bottom of the box and support the switch units. A spring 22 surrounds each post and presses against the bottom of the box and outwardly against a washer 23.

Each post has a head 24 somewhat larger in diameter than the main stem portion and a neck 25 smaller than the stem portion. The outer surface 26 is preferably inclined or tapered and the walls 27 of the contracted neck are also preferably tapered or inclined. The back plate 20 of the switch unit is provided with an opening or perforation for each post, preferably one at each corner of the plate. These openings resemble keyholes. The lower end 28 of each opening is larger than the head of its post and smaller than the washer so that the plate can be readily slipped on to the posts and pressed against the spring-supported washers.

The upper end 29 of each opening is of approximately the same size as the main stem of its post so as to position and guide the plate and its switch unit. Between the upper and lower parts of each opening the sides are contracted at 30 to a width less than the diameter if the main stem of the post and only slightly larger than the diameter of the neck 25 so that the plate 20 may be slid downwardly from the position of Fig. 5 to the position of Fig. 6 when the plate has been located in the plane of the necks as shown in Fig. 9.

While the plate is in this plane it can be further slid downwardly to the position shown in Fig. 7. Once the plate 20 has been positioned as shown in Fig. 7 and pushed toward the bottom of the box the main stem of the post is guided and held by the contracted part 30 so that the switch plate can not be displaced vertically or horizontally except toward and from the bottom of the box. The inclined end 26 facilitates application of the switch plate to the posts and the inclined walls 27 facilitate the sliding of the plate from the position of application (Fig. 5) to the position of interlock (Fig. 7).

A part 31 of the face plate is preferably set back from its main plane so as to provide an abutment for engaging the outer face of the switch unit within the box. This part 31 is provided with suitable passages 32 for the finger levers or switch actuators 19.

According to the usual practice the box 14 is first secured in the wall 33 in any suitable manner and connected to the cable or conductor system.

The switch unit is then inserted in the box and applied to the supporting posts as above described.

When the switch unit with its attached back plate has been located on the posts in the box it may be wired in the usual way and tested before applying the face plate 15.

The face plate is then applied over the finger levers and the screws 16 inserted and tightened until the face plate is drawn snugly against the wall. The parts are so proportioned that when the box is installed in the usual way the switch unit projects outward slightly so that it must be pushed inwardly against the springs 22 in order for the face plate to seat against the wall 33. In this way the springs apply a pressure to ensure snug engagement between the switch unit and the inner face of the inset portion 31 of the face plate. As the four corners of the switch unit are supported independently it is obvious that the tightening of the screws will clamp the face plate flat against the wall and at the same time cause the switch unit to tilt (if necessary) and adjust itself on the posts even though the box may not have been installed plumb or true with the wall.

It is preferred that the springs are of such strength that with the face plate secured in place, normal operation of the electrical device will not further compress the springs to any substantial degree. This prevents shifting of the interior parts when in normal use.

The modified type of guide post 21' (shown in Figs. 10 and 11) has a head 24' as an abutment for the washer 23. A screw 24" whose head is still larger serves to prevent removal of the back plate 20 of the switch unit.

Figure 3:
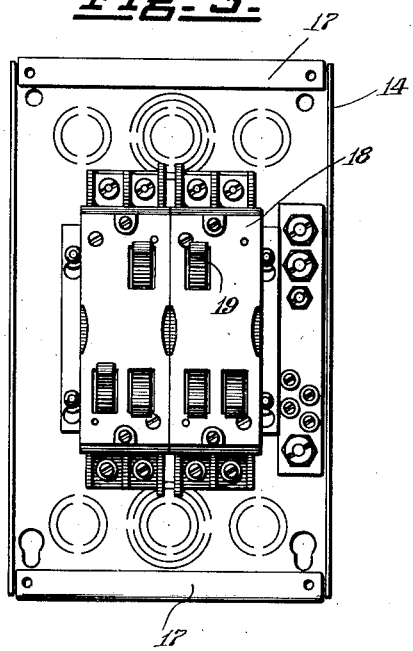
Fig. 3 is a front view without the face plate.
Figure 4:
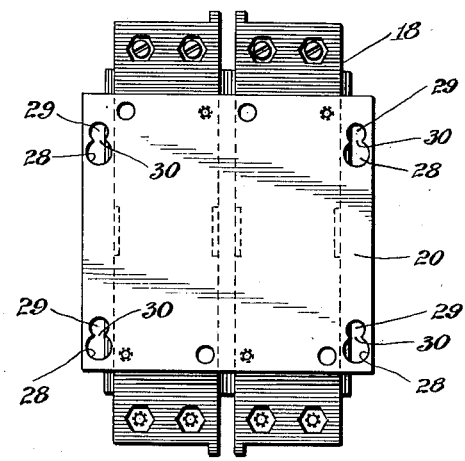
Fig. 4 is a rear view of the switch unit.

In Figs. 3 and 4 I have shown the switch plate provided with the same keyhole type of opening for each post. One or more of these openings, however, may be in the form of an open ended slot 29', the width of which is only sufficiently greater than the diameter of the main stem of the post to permit the plate to slide on the post. The head 24 of the post is of course larger than the width of the slot and the washer 23 is also larger. This type of interlock although somewhat easier to assemble is not so secure. The form shown in Figs. 3 and 4 may be installed in the position shown or may be installed in any other position without danger of the parts being displaced after installation.

When using the keyhole opening with the post illustrated in Figs. 10 and 11, it is preferred that the opening 28 be large enough to pass over the head of screw 24", the narrowed portion 30 being of less width than the diameter of post 21' but of greater width than the diameter of the threaded portion of screw 24".

As shown in Fig. 11, the opening 29 is smaller than the head of screw 24" but large enough to slide on the post 21' or its head 24'.

When speaking of the switch plate it should be understood that a plurality of switch plates or supporting members may be used instead of the single one shown, each having one or more holes or slots for the guide post structure. Each switch plate or supporting member may be made of a part separate from the electrical device, as shown, or may be made integral with the electrical device if desired.

I claim:

1. In a switch construction, a box having supporting posts with spring backing members, a switch unit having means coacting with the posts whereby the unit is applied to the posts in the box by a movement inwardly and laterally of the posts to interlock the unit on the posts and a face plate applied to the box and snugly fitting the switch unit at various angles.

2. In a switch box, a number of guide posts, a switch unit having a plate detachably interlocked with said posts, a face plate fitting against said switch unit and means for drawing said face plate and said switch unit inwardly guided by said posts, each post having a head, said plate having a keyhole shaped perforation for each post, a part of the perforation being of approximately the diameter of the post and smaller than the head of the post and a part being of a larger diameter than the head of the post with a contracted neck part between the larger and the smaller parts.

3. The combination of a box having a guide post, a switch unit having a plate adapted to be interlocked with said post, said post having a head of a diameter larger than the post and with a neck below the head of a diameter smaller than the post and the plate having an opening, one part of which is larger than the head to permit the plate to be applied to the post, another part of the opening being of less width than the diameter of the post and greater width than the diameter of said neck to accommodate the neck of the post and to permit the plate to be moved at right angles to the axis of the post, and a part of the opening being of less diameter than the head of the post and of approximately the same diameter as the post to permit the plate to be guided on the post, a face plate fitting against the switch unit and screws for individually drawing the corners of the face plate toward the box.

4. The combination of a switch box, a switch unit therein, means for resiliently supporting said switch unit in the box, a face plate having a depressed portion adapted to interlock with and snugly fit over the switch unit, the remaining portion of the face plate covering the box and means for adjustably fastening the interlocked plate and switch unit to the box in angular relationship said switch unit being secured in the box independently of the face plate when the face plate is removed.

5. In an electric device, a box having posts secured in the bottom thereof, said posts having heads on their front ends, an electrical unit having a back plate with slots slidably mounted on said posts, spring means pressing said unit toward the front of the box, the heads of the posts interlocking with the walls of the slots and preventing the unit from accidental removal from the posts, a face plate, screws for drawing the face plate toward the box and against the unit and causing the unit to compress the spring means, said posts holding the unit in the box independently of the face plate when the face plate is removed.

6. In a panel board construction, a box adapted to be secured in a recess in a wall, a face plate, a plurality of screws for drawing the face plate toward the box and against the wall around the recess, a plurality of guide posts secured in the bottom of the box, a block mounted to slide on said posts, springs mounted on said posts for pressing said block against the back of said face plate and means for holding the springs on the posts when the block is removed.

RAYMOND N. ROWE.